Aug. 15, 1933.  C. M. CAVE, JR  1,922,928
PRESSURE CONTROL DEVICE
Filed Jan. 20, 1933  2 Sheets-Sheet 1
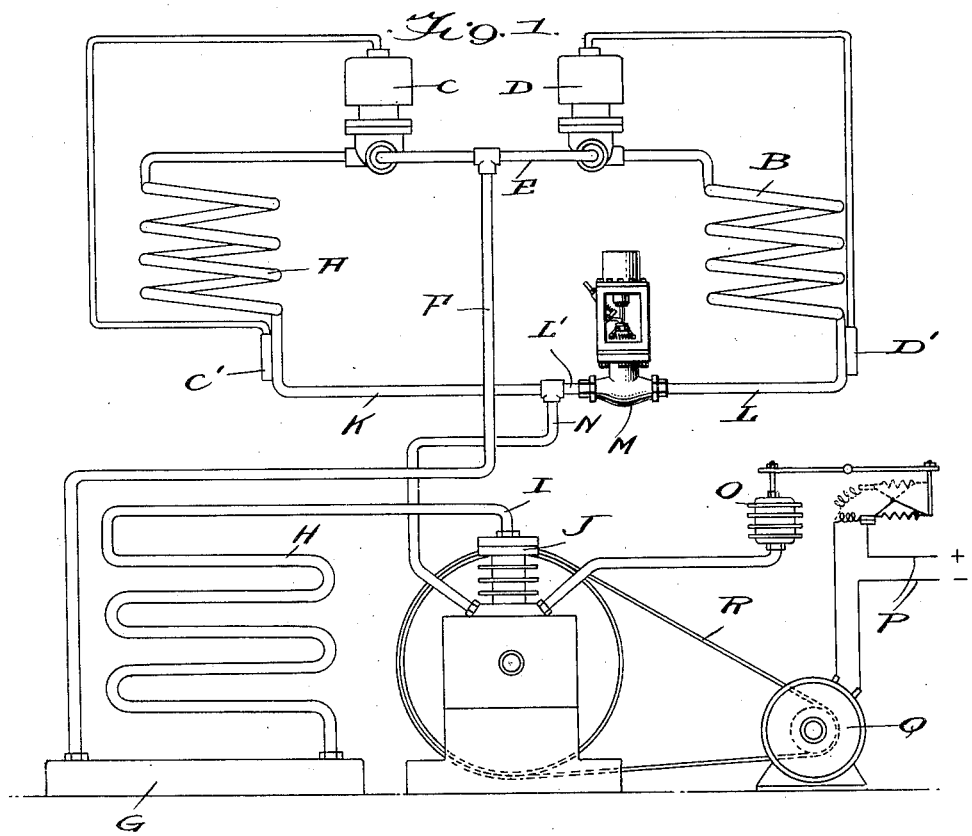
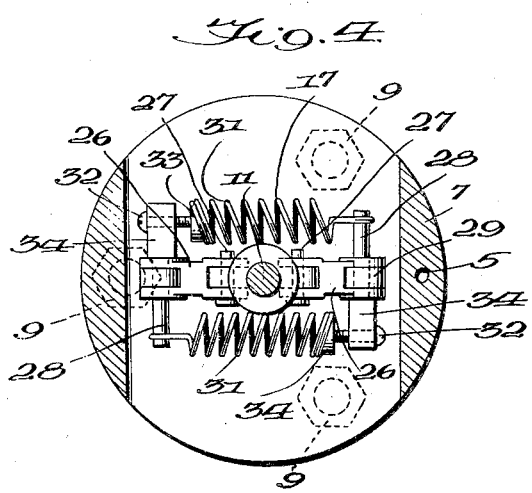
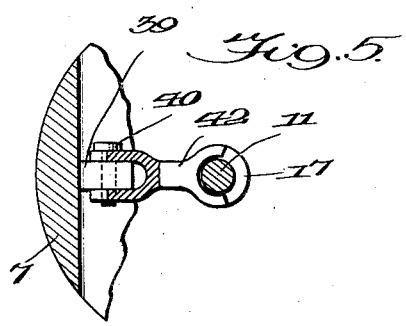
Inventor
Channing Moore Cave, Jr,
By Richard L. Babcock
Attorney

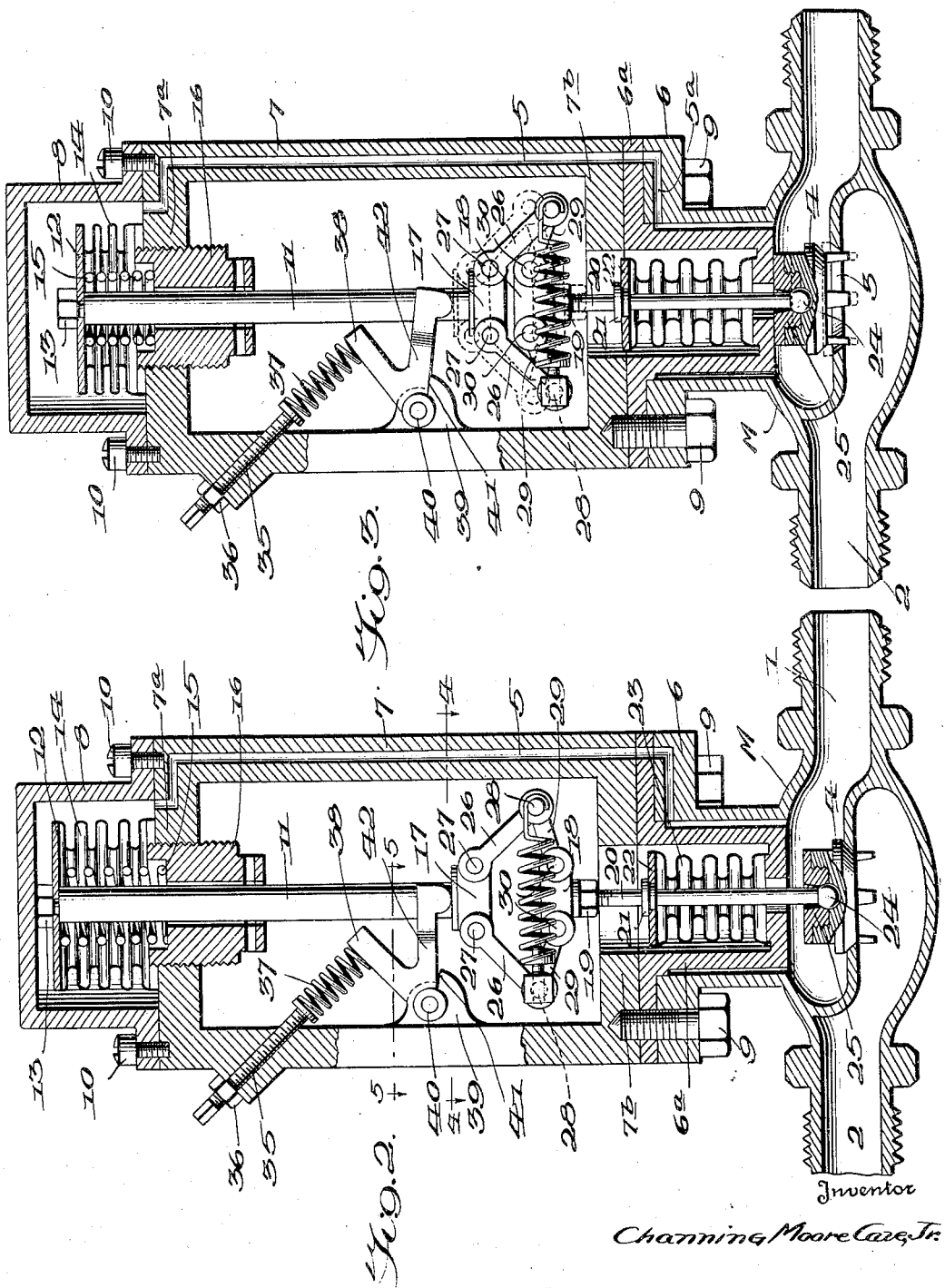

Patented Aug. 15, 1933

1,922,928

UNITED STATES PATENT OFFICE 1,922,928

PRESSURE CONTROL DEVICE

Channing Moore Cave, Jr., New Orleans, La.

Application January 20, 1933. Serial No. 652,757

8 Claims. (Cl. 50—23)

This invention relates to a pressure operated valve unit for controlling the pressure conditions in a refrigerator evaporating unit of a refrigerating system involving a plurality of such evaporating units operated by a single condensing unit and requiring a wide range of temperatures in the different evaporators, the valve being interposed in the return or low pressure or suction circuit and being closed to isolate its evaporator from the remainder of the return or suction circuit when the compressor is idle and when pressure in its evaporator coil has not reached the maximum for which the valve unit is set and opening under the thrust of such pressure when it has reached its maximum to release the expanded gases from said evaporator to the return or suction circuit and thereby operate the usual pressure switch to start up the compressor of the condensing unit, and automatically close when the pressure has been reduced by the action of said condensing unit to the minimum limit for which said valve unit has been set, thus cutting out its evaporator from the suction circuit and so isolating it from the system without interfering with the operation or conditions in the other evaporating unit or units of the system.

The primary objects of the present invention are to provide an automatic pressure controlled valve unit suitable to this purpose; to provide in such a valve unit means of very fine or delicate adjustment whereby the mechanism may be set to open and to close the valve over a wide range of pressures; to provide a floating snap action for opening and closing the valve at the extremes of the pressures for which the mechanism is adjusted at any particular time; to provide means for adjusting a snap action operating spring; to provide easy means of access for adjustment of the parts under all conditions; and to provide a construction whereby the upper part of the valve casing and the valve operating mechanism may be removed to permit access in case of leakage of the lower bellows for purposes of repairing the same without removing the valve from the suction circuit.

In the accompanying drawings:

Figure 1 represents diagrammatically a refrigerating system employing two evaporators and a single condensing unit and wherein a valve unit designating M and embodying my invention is interposed in the return pipe L between evaporator B and the return or suction pipe L';

Figure 2, a central sectional view of a valve unit embodying my invention, the valve being closed;

Figure 3, a view corresponding to Fig. 2, the valve being opened;

Figure 4, a sectional view on line 4—4 of Fig. 2, looking in the direction of the arrows; and Figure 5, a detail sectional fragmentary view on line 5—5 of Fig. 2, looking in the direction of the arrows.

Referring now in detail to the drawings, A designates one evaporator; B, another evaporator; C and D thermal expansion valves provided with controls C' and D' respectively for respectively regulating the supply of refrigerant to the respective evaporators A and B from the common supply pipe E which in turn receives liquid refrigerant through the pipe F from the receiver G. A compressor J draws the expanded refrigerant gases from the evaporator B through the return or suction pipe L through the valve coupling M to suction pipe N and from evaporator A through return or suction pipe K to return or suction pipe N and draws the said gases in from pipe N, pumping them out through pipe or tube I to condenser H from which they are received in receiver G. A tube establishes communication between the interior of pipe N and the interior of the bellows element of a pressure operated or controlled switch designated generally as O, which automatically opens and closes the electrical circuit P of a motor Q in accordance with the pressure conditions in the return or suction circuit. A belt R adapted to be driven by the motor Q serves to operate the compressor J when said motor Q is energized.

With the exception of the automatic pressure operated valve unit generally designated as M in said Fig. 1, all parts and elements described in the immediately preceding paragraph are old and in common use in the usual multiple evaporator unit refrigerating systems and are not claimed by me, but are thus briefly referred to and conventionally illustrated simply to promote a clearer understanding of the disposition and operation of my invention in such a system.

The valve coupling M is formed with an intake chamber 1 in communication with return pipe L and with a discharge chamber 2 in communication with the discharge pipe L', said chambers being divided by a wall formed with a communicating opening having a valve seat 3 and normally closed by the valve 4, and it is the opening and closing of this valve 4, thus controlling communication between the chambers 1 and 2, with which my invention concerns itself.

From the chamber 1 extends a cylindrical flange having at its upper end an annular flange 6, said vertical cylindrical flange defining a cylindrical chamber communicating with the chamber 1 and preferably being integral with the coupling M and being adapted to receive in annularly spaced relationship the hollow cylindrical portion of the lower end or head $6^a$ of a casing comprising said lower head $6^a$, a main body 7 having an upper wall $7^a$ and a lower wall $7^b$ centrally longitudinally bored in registry with the inner cylindrical face of the lower head $6^a$, and an upper head 8.

Bolts or stud screws 9 extending vertically upward through the flange 6, annular flange of the bottom head $6^a$, and into the lower end $7^b$ of the body 7, and screw-threaded into said end $7^b$, serve to hold said parts firmly together and to secure said lower head $6^a$ and body 7 to the valve coupling M. Similarly screws 10 extending through the horizontal flange of the upper head 8 and screwing into the upper end $7^a$ of the body 7 serve to hold said upper head 8 tightly in position. Suitable packing means, not shown, is to be interposed between the opposed upper face of flange 6 and lower face of the annular flange of lower head $6^a$, between the upper face of said annular flange of head $6^a$ and the lower face of the lower end $7^b$ of the body 7, and between the upper face of upper end $7^a$ of body 7 and the lower face of the upper head 8, to render these joints tight against the ingress or egress of liquid, air or gas, all as will be readily understood.

A conduit or bore 5 extending longitudinally through a portion of body 7 and having its upper end offset so as to extend through the upper end $7^a$ through the top surface thereof at a point radially inward of the inner face of upper head 8, and at its lower end extending through the annular flange of lower head $6^a$ and into the flange 6 where it communicates with a short horizontal passage $5^a$ in communication with the annular space between the opposed inner wall of the vertical flange of valve coupling M and the outer cylindrical face of lower head $6^a$, thus establishing free and unimpeded communication at all times between intake chamber 1 and the interior of upper head 8.

A supporting rod 11 extends freely vertically through a centrally bored adjusting nut 16 threaded in the centrally disposed vertically internally screw-threaded bore extending through the upper end $7^a$ of body 7. The upper end of this rod 11 is reduced to extend through the centrally disposed hole in a plate 12 and preferably is externally screw-threaded to receive a cooperating nut 13, whereby the said plate 12 will be clamped between the opposing adjacent face of the end of the main body of said rod 11 and of said nut 13, solder being used between parts 11, 12 and 13 to form a tight joint. A bellows 14 has its upper end soldered to the outer peripheral face of the plate 12 to make a gas-tight joint therewith at all points of the periphery thereof and similarly has its lower end soldered to the upper end $7^a$ of body 7 concentrically with the axis of adjusting nut 16, whereby the interior of the bellows 14 will be effectually sealed off against the entrance thereto of any gases or liquids from the pressure chamber defined between the interior of the upper head 8, and the upper end $7^a$ of the body 7.

A spring 15 is disposed about the upper end portion of rod 11 between the opposed faces of the plate 12 and the adjusting nut 16 and screwing the nut 16 up or down as desired serves to adjust the degree of compression of said spring 14. Said rod 11 carries at its lower end a flange, plate or enlargement 17.

The valve-stem 20 is provided at its upper end with a similar plate or enlargement 18 screw-threaded thereon and adapted to be locked in adjusted position by lock nut 19, and extends downwardly through bellows 23 and a central bore in the extreme lower end of lower head $6^a$ and has its extreme lower end portion formed with a ball 24 to fit in a correspondingly shaped socket formed between the upper face of the central portion of valve 4 and the lower face of a nut 25 screwing into the upper part of said valve 4. A stop 21 is soldered to the valve-stem 20 to make an air-tight joint at all points therewith and thereafter a plate 22 centrally perforated to receive the valve-stem 20 is soldered to the lower face of said stop 21 and to the valve-stem 20 to make a gas-tight joint therewith at all points. The upper end of the bellows 23 is soldered to the plate 22 so as to make a gas-tight joint at all points therewith and the lower end of said bellows 23 is soldered to the upper face of the lower end of the lower head $6^a$ so as to make a gas-tight joint therewith at all points peripherally about the central opening therethrough through which the valve-stem 20 extends.

The lower face of plate 22 subject to the pressure of gas in chamber 1 and the upper face of valve 4 similarly subject to the gas in said chamber 1, are approximately of the same area so that the valve is balanced and requires no effort on the opening mechanism to open the valve. The area of the valve is of sufficient size to provide an opening large enough for a free travel of the gases without stretching bellows 23 needlessly.

From the foregoing it will be noted that although gas is admitted into the interior of the upper head 8 it is sealed therein by the bellows 14 against escape down through the nut 6 and to the interior of the main body 7 and similarly that although gas may penetrate along the valve-stem 20 through the lower end of the lower head $6^a$ it is sealed off against escape into the main body 7 by means of the bellows 23 and associated parts.

Two diverging links 26 are pivotally connected at their uper ends, by pivot pins 27, to the flange or plate 17 carried by the rod 11 on opposite sides of the axis of the latter and diverging downwardly outwardly away from each other, have their lower end portions pivotally connected by means of pivot pins 28 to the upper ends of upwardly outwardly diverging lower arms 29, which in turn have their lower ends pivotally connected by means of pivot pins 30 to the plate or flange 18 mounted on the upper end of the stem 20.

The pins 28 have axial extensions 34 of larger, and preferably angular in, cross section, the axial extension 34 of one being opposed to the cylindrical pin portion 28 of the other and said axial extensions 34 being formed with transverse bores through which extend adjusting screws 32 engaging in screw-threaded bores in blocks 33 respectively mounted in the respective adjacent ends of the snap action springs 31 which have their respective other ends hooked over the respective cylindrical pin portions 28.

An adjusting screw 35 threaded through the body 7 and locked in a desired position of adjustment by lock nut 36 bears against the upper end of a helical spring 37 disposed between said screw 35 and the upper arm 38 of a valve closing resistor pivotally mounted by a pin 40 in a bracket 39 rigid with said main body section 7. Said valve closing resister or adjustor has a lower bifurcated arm 42 adapted to fit about the rod 11 and to bear against the upper face of the flange or enlargement 17 when the same is in such position as to lie within the reach of said arm 42 in its limited movement. Said bracket 39 is formed with an abrupt stop shoulder 41 lying in the normal path of movement of said arm 42 and limiting downward swinging movement thereof, so as to render the latter inoperative against the flange or enlargement 17 when the latter shall have moved downward beyond a limited throw of said arm 42.

Considering now the operation of the invention, we will consider it first in its relationship to the system in which it is used. We will assume that evaporator A is submerged in brine, the brine being in an ice cream cabinet, and that it is used for keeping ice cream in good condition and requiring a temperature from two degrees to ten degrees. Evaporator B is in a grocery box requiring a temperature from thirty-eight degrees to forty-five degrees, it being considered desirable to have the evaporator B in the grocery box defrost itself before the next running cycle is resumed by the compressor so that enough moisture is returned to the food stuff to prevent its complete dehydration. The condensing unit is idle and the pressure switch O is open. Under the conditions mentioned the mechanism controlling valve 4 will be set to open said valve when the pressure in evaporator B reaches a pressure of twenty-six pounds per square inch and the pressure switch is set to close the circuit to start up the motor Q when the pressure in the return pipe N reaches ten pounds per square inch, and to open said circuit when said pressure in return pipe N falls to one pound per square inch.

Under the foregoing conditions with the condenser unit idle the pressure in evaporators A and B is building up, and as the pressure builds up in evaporator B a similar pressure is building up in the chamber inside of upper head 8 and forcing the plate 12 and rod 11 down. As this pressure builds up in said head 8 and forces rod 11 down the links 26 and 29 will flatten out, their outer ends moving away from each other against the pull of the snap springs 31 as the flanges 17 and 18 approach each other and as the axes of the pivot pins 28 approach the horizontal line of the axes of the pivot pins 30. As soon as the axes of the pins 28 move past dead center below the axes of the pivot pins 30 the springs 31 are made to draw said pins 28 toward each other with a quick snap action, so pulling the valve-stem 20 upward and opening or raising the valve 4, this action taking place when the pressure in said upper head 8 has attained twenty-six pounds per square inch. The opening of valve 4 permits the escape of the expanded gases from evaporator B into the return pipes L', N and K, with the result that the pressures in all of these pipes are raised well above fifteen pounds, so that the pressure switch O is at once operative, bringing into operation the motor Q and compressor J, which withdraws the expanded gases from the evaporators A and B and return pipes L, L', K and N and after compressing it forces it through the pipe I to condenser H to receiver G from whence it passes in liquid form through supply pipe F to pipe E to expansion valves C and D of the evaporators A and B respectively as needed.

As the pressure is lowered by the withdrawal of the expanded gases by the compressor J it causes a corresponding reduction in the temperature, so that by the time the refrigerant has reached a low of twelve pounds per square inch pressure in evaporator B, it is cold enough for the requirement of that evaporator and accordingly the screw 35 will have been set at such position as to set the spring 37 under such compression as to allow spring 15 to move the rod 11 back to original position to close the valve 4 when the pressure in the upper head 8 has fallen to twelve pounds per square inch. This is accomplished by the spring 15 overcoming the resistance of the pressure in said upper head 8 and the resistance of the spring 37, causing the flange 17 to move upward away from the flange 18 and thus causing the arms 26 and 29 to move upward and spread outwardly against the action of the springs 31 until the axes of the pivot pins 28 have moved upward across dead center beyond the axes of the pivot pins 30, at which time the springs 31 will quickly draw the pins 28 toward each other, resulting in shooting or snapping the valve 4 down to seated and closed position. When this operation takes place the evaporator B will be isolated or cut out from the suction or return circuit so as not to be further affected by the continued operation of the condensing unit, which will continue to run until the pressure has been reduced to one pound per square inch.

It will be obvious that the turning of the adjusting nut 16 to increase the compression of the spring 15 will make just that much more of a load for the pressure in the upper head 8 to overcome and hence will increase the amount of pressure necessary for the gas to attain before the valve is opened and conversely that adjusting of the nut 16 to reduce the pressure of the spring 15 reduces the load to be overcome and so reduces the amount of pressure necessary to be attained by the gas in upper head 8 before the valve 4 is opened.

Similarly adjustment of the screw 35 to increase the compression of the spring 37 increases the load to be overcome by the spring 15 and thus makes it necessary to reduce the pressure of the gas in upper head 8 to compensate for such added compression of spring 37 before the valve 4 may be closed, whereas adjustment of screw 35 to reduce the degree of compression of spring 37 reduces the load opposed to spring 15 and so raises the load of pressure at which point the closing of valve 4 may take place. Stated briefly, by increasing the compression of spring 15 the opening pressure is raised, whereas by increasing the compression on spring 37 the closing pressure is lowered.

Regarding the interrelation of the valve limit closing mechanism or adjustment and the main operating valve mechanism, the spring 37 and its adjustment will have no effect on the opening of the valve. It is true that increased compression of the spring 37 will exert a greater thrust by the arm 42 on the flange 17 so long as that flange is engaged by said arm 42, but as soon as the arm 42 strikes against stop 41, when the dead center line of pivot pins 30 and center line of pivot pins 28 coincide, such pressure on the flange 17 will be relieved and from that point on the operation will be entirely due to the pressure of the gases in the upper head 8. Due to the help of the spring 37 up to that point there will be a slight pause while the pressure is building up to compensate for the loss of the aid of the spring 37.

The tension of the springs 31 may be adjusted by means of the screws 32 as stated to compensate for any back pressure and also of course to increase the tension of the springs and their snap action as may be desired.

When the rod 11 moves down under the thrust of the gases under pressure the valve 4 will of course be resting on its seat 3 and consequently the valve stem 20 will be held against endwise movement by said valve 4 and when the rod 11 moves upward under the thrust of the spring 15 in the initial movement of the valve closing operation the nut 25 will be in contact by its upper face with the lower face of the lower head 6ª and will hold valve-stem 20 against endwise movement under the upward pull exerted by the rod 11 through the snap action mechanism, all as is obvious.

From the above described relationship of the springs 15 and 37 and their respective adjusting means it is apparent that nut 16 may be turned to increase the compression of spring 15 so that a greater pressure of the gases will have to be exerted to open the valve 4 and the screw 35 may be adjusted to increase the compression of spring 37, whereby a lower pressure of gases will have to be attained before the valve 4 can close, or the compression of spring 37 may be decreased, so raising the closing pressure while the increase of compression of the spring 15 raises the opening pressure required. Again the nut 16 will be adjusted to decrease the compression of the spring 15, so lowering the opening pressure required, while the spring 37 may be left in its previous condition or may be further compressed, so lowering the effective closing pressure required or its compression may be decreased, so raising the effective closing pressure required. Thus, it will be seen that there is provided great delicacy of adjustment and an extremely wide range of adjustment of the pressure points at which the opening and closing of the valve 4 takes place.

All parts and elements are to be made of materials suitable to the use for which the invention is intended and primarily I contemplate the use of the invention in connection with refrigerating systems using refrigerants that do not corrode or decompose brass and/or copper.

Since the movement of the rod 11 under the thrust of the pressure of the medium to be controlled results in moving the axes of the pivots 28 downward through dead center position and below the axes of the pivots 30 to actuate the snap-acting mechanism to open the valve and similarly in moving upward under the thrust of spring 15 serves to move the axes of pivots 28 upward through dead center position to a point above the axes of the pivots 30 to cause actuation of the snap-acting mechanism to close the valve 4, said rod 11 may well be termed an actuating rod or actuating means or the actuator.

Also it is obvious that the valve 4 is merely an illustration of one form of control element, the invention being illustrated in its simplest form wherein the control is affected in the most direct manner without the interposition of any other parts. However, it is obvious that the control element 4 need not necessarily be a valve but might be any other control element automatically moved in accordance with the variations of pressure of the controlled medium. Also, while the invention is primarily intended for the use illustrated and described it is of course capable of use in other connections.

Having thus described my invention, what I claim as new and desire to secure by Letters Patent is:

1. An automatic pressure actuated snap-acting pressure control device comprising a control valve, an actuator rod subject to the pressure action of the medium of which the pressure is to be controlled and adapted to move between two extreme positions corresponding to the closed and open positions of said valve in response to gradual changes in the pressures of said medium, and snap-acting means interposed between and connecting said actuator and valve whereby the latter will be caused to suddenly move to open or closed position in accordance with the movement of the actuator rod to its corresponding extreme position, said actuator rod being provided with an enlarged portion, in combination with a main helical spring at all times acting on said actuator rod in opposition to the pressure of said medium to move and hold said rod in one of its extreme positions corresponding to the closed position of the valve, means for varying the degree of compression of said main spring to vary the degree of pressure of said medium required to move said actuator rod to its other extreme position corresponding to the open position of said valve, means pivotally mounted to a fixed object and adapted to move with and bear on said enlargement, a stop adapted to engage said means and prevent its engagement with said enlargement as said actuator rod approaches the final stages of its movement to its extreme position corresponding to the open position of said valve, a supplemental helical spring bearing on said means in opposition to said main spring, and means for adjusting the degree of compression of said supplemental spring independently of the adjusting means of the main spring.

2. An automatic pressure actuated snap-acting pressure control device comprising a control valve, an actuator subject to the pressure action of the medium of which the pressure is to be controlled and adapted to move between two extreme positions corresponding to the closed and open positions of said valve in response to gradual changes in the pressure of said medium, and snap-acting means interposed between and connecting said actuator and valve whereby the latter will be caused to suddenly move to open or closed position in accordance with the movement of the actuator to its corresponding extreme position, said actuator being provided with an enlarged portion, in combination with a main spring at all times acting on said actuator rod in opposition to the pressure of said medium to move and hold said actuator in one of its extreme positions corresponding to the closed position of the valve, means for varying the degree of energy exerted by said main spring on said actuator, means pivotally mounted to a fixed object and adapted to move with and bear on said actuator, a stop adapted to engage said means and prevent its engagement with said actuator as said actuator approaches the final stages of its movement to its extreme position corresponding to the open position of said valve, a supplemental spring bearing on said means in opposition to said main spring, and means for adjusting the degree of energy exerted by said supplemental spring independently of the adjusting means of the main spring.

3. An automatic pressure actuated snap-acting pressure control device comprising a control valve, an actuator, and snap-acting means interposed between and connecting said actuator and valve, in combination with a main helical spring acting on said actuator to move and hold said actuator in one of its extreme positions, independent means for varying the degree of compression of said main spring, means adapted to move with and bear on said actuator, a stop adapted to engage said means and prevent its engagement with said actuator as the same approaches the final stages of its movement to its other extreme position, a supplemental helical spring bearing on said means in opposition to said main spring, and independent means for adjusting the degree of compression of said supplemental spring.

4. An automatic pressure actuated snap-acting pressure control device comprising a control element, an actuator, and snap-acting means interposed between and connecting said actuator and element, in combination with a main helical spring acting on said actuator in opposition to the pressure of the medium to be controlled to move and hold said actuator in one of its extreme positions, means for varying the degree of compression of said main spring, means adapted to move and bear on said actuator, a stop adapted to engage said means and prevent its engagement with said actuator as said actuator approaches the final stages of its movement to its other extreme position, a supplemental helical spring bearing on said means in opposition to said main spring, and means for adjusting the degree of compression of said supplemental spring.

5. An automatic pressure actuated snap-acting pressure control device comprising a control element, an actuator, and snap-acting means interposed between and connecting said actuator and element, in combination with a main spring acting on said actuator in opposition to the pressure of the medium to be controlled to move and hold said actuator in one of its extreme positions, independent means for varying the degree of energy exerted by said main spring on said actuator, means adapted to move and bear on said actuator, a stop adapted to engage said means and prevent its engagement with said actuator as said actuator approaches the final stages of its movement to its other extreme position, a supplemental spring bearing on said means in opposition to said main spring, and independent means for adjusting the degree of energy exerted by said supplemental spring.

6. An automatic pressure actuated snap-acting pressure control device comprising a control element, an actuator, and snap-acting means interposed between and connecting said actuator and element, in combination with a main spring acting on said actuator in opposition to the pressure of the medium to be controlled to move and hold said actuator in one of its extreme positions, means for varying the degree of energy exerted by said main spring on said actuator, spring pressed means adapted to bear on said actuator in opposition to said main spring, a stop adapted to engage said means and prevent its engagement with said actuator as said actuator approaches the final stages of its movement to its other extreme position, and means for varying the degree of energy exerted by said means in opposition to said main spring.

7. An automatic pressure actuated snap-acting pressure control device comprising a control element, an actuator, and snap-acting means interposed between and connecting said actuator and element, in combination with a main spring acting on said actuator in opposition to the pressure of the medium to be controlled to move and hold said actuator in one of its extreme positions, means for varying the degree of energy exerted by said main spring on said actuator, spring pressed means adapted to bear on said actuator in opposition to said main spring, said actuator and spring pressed means being so associated that the actuator is relieved of the action of said spring pressed means as said actuator approaches the final stages of its movement to its other extreme position and prior to the actuation of said snap-acting means incident to its movement to said position, and so that the force of said spring pressed means is applied to said actuator in opposition to said main spring as said actuator moves in the reverse direction and prior to the actuation of said snap-acting means incident to said reverse movement of said actuator.

8. An automatic pressure actuated snap-acting pressure control device comprising a control element, an actuator, and snap-acting means interposed between and connecting said actuator and element, in combination with a main spring acting on said actuator in opposition to the pressure of the medium to be controlled to move and hold said actuator in one of its extreme positions, spring pressed means adapted to bear on said actuator in opposition to said main spring, a stop adapted to engage said means and prevent its engagement with said actuator as said actuator approaches the final stages of its movement to its other extreme position, and means for varying the degree of energy exerted by said means in opposition to said main spring.

CHANNING M. CAVE, Jr.